(12) United States Patent
Tang

(10) Patent No.: US 8,065,692 B2
(45) Date of Patent: Nov. 22, 2011

(54) OPTICAL DISK DRIVE HAVING SUPPORTING BRACKET AND NOTEBOOK COMPUTER USING THE SAME

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 815 days.

(21) Appl. No.: 12/131,047

(22) Filed: May 31, 2008

(65) Prior Publication Data

US 2009/0172717 A1    Jul. 2, 2009

(30) Foreign Application Priority Data

Dec. 29, 2007 (CN) .......................... 2007 1 0203560

(51) Int. Cl.
*G11B 17/03* (2006.01)
(52) U.S. Cl. ....................................... 720/613; 720/610
(58) Field of Classification Search ............... 369/30.48, 369/30.6, 30.75, 30.9, 30.92–30.97, 30.99; 720/600, 601, 609–613, 652–655; 361/679.33–679.39; 206/308.1
See application file for complete search history.

(56) References Cited

U.S. PATENT DOCUMENTS

| | | | | |
|---|---|---|---|---|
| 4,867,302 | A * | 9/1989 | Takahashi | 206/755 |
| 6,014,351 | A | 1/2000 | Kinoshita et al. | |
| 6,683,837 | B1 | 1/2004 | Kayl | |
| 6,809,924 | B2 * | 10/2004 | Kagawa | 360/133 |
| 2008/0172683 | A1 * | 7/2008 | Suenaga | 720/601 |

FOREIGN PATENT DOCUMENTS

| | | | |
|---|---|---|---|
| JP | 2005004922 A * | 1/2005 | |
| TW | 470200 | 12/2001 | |
| TW | 534351 | 5/2003 | |
| TW | 200719322 A | 5/2007 | |

OTHER PUBLICATIONS

Machine-Assisted Translation of JP 2005004922 A.*

* cited by examiner

*Primary Examiner* — Nathan Danielsen
(74) *Attorney, Agent, or Firm* — Altis Law Group, Inc.

(57) ABSTRACT

An exemplary optical disk drive for a notebook computer includes a tray, and a supporting bracket rotatably connected to the tray for supporting the tray when the tray extends from the notebook computer. A notebook computer employing the optical disk drive is also provided.

6 Claims, 6 Drawing Sheets

OPTICAL DISK DRIVE HAVING SUPPORTING BRACKET AND NOTEBOOK COMPUTER USING THE SAME

BACKGROUND

1. Field of the Invention

The present invention relates to optical disk drives, and more particularly, to an optical disk drive being employed in a notebook computer.

2. Discussion of the Related Art

Optical disk drives are widely used to access video, audio and data files stored on optical disks. Optical disk drive is a technology leap from the days of phonographs. For notebook computers, the optical disk drive is an indispensible component.

FIG. 6 represents a typical notebook computer 100 with a typical optical disk drive 10. The optical disk drive 10 includes an auto-loading entrance 11, a tray 12 and a turntable 13. The entrance 11 is located at a side of the notebook computer 100. The tray 12 is installed inside the notebook computer 100 in a movable way, and can depart from or slide into the notebook computer 100. The tray 12 includes a base plate 122, and a bar plate 124 connected to an end of the base plate 122 for covering the entrance 11. The turntable 13 is positioned at a center of a surface of the base plate 122. The base plate 122 defines a circular disk carriage 123. When the optical disk drive opens the tray 12, the user can place a CD on the circular disk carriage 123. When the turntable 13 rotates, the CD will be driven to rotate accordingly. However, when the tray 12 extends from the entrance 11 of the notebook computer 100, the tray 12 is suspended in the air. Typically, when the CD is placed on the turntable 122, it is also required that a suitable pressing force be applied to press the CD downward on the base plate 122 of the tray 12. This means the tray 12 of the optical disk drive 10 to be pressed downward frequently. Therefore, lifetime of the optical disk drive 10 is shortened.

What is needed, therefore, is a new optical disk drive of notebook computer that has a long service life.

SUMMARY

An optical disk drive for notebook computer according to a preferred embodiment includes a tray, and a supporting bracket rotatably connected to the tray for supporting the tray when the tray extends from the notebook computer.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical disk drive and notebook computer using the optical disk drive. Moreover, in the drawings, like reference numerals designate corresponding parts throughout the several views, and all the views are schematic.

DETAILED DESCRIPTION OF THE PREFERRED EMBODIMENTS

Reference will now be made to the drawings to describe preferred embodiments of the present optical disk drive and notebook computer using the optical disk drive, in detail.

Figure 1:
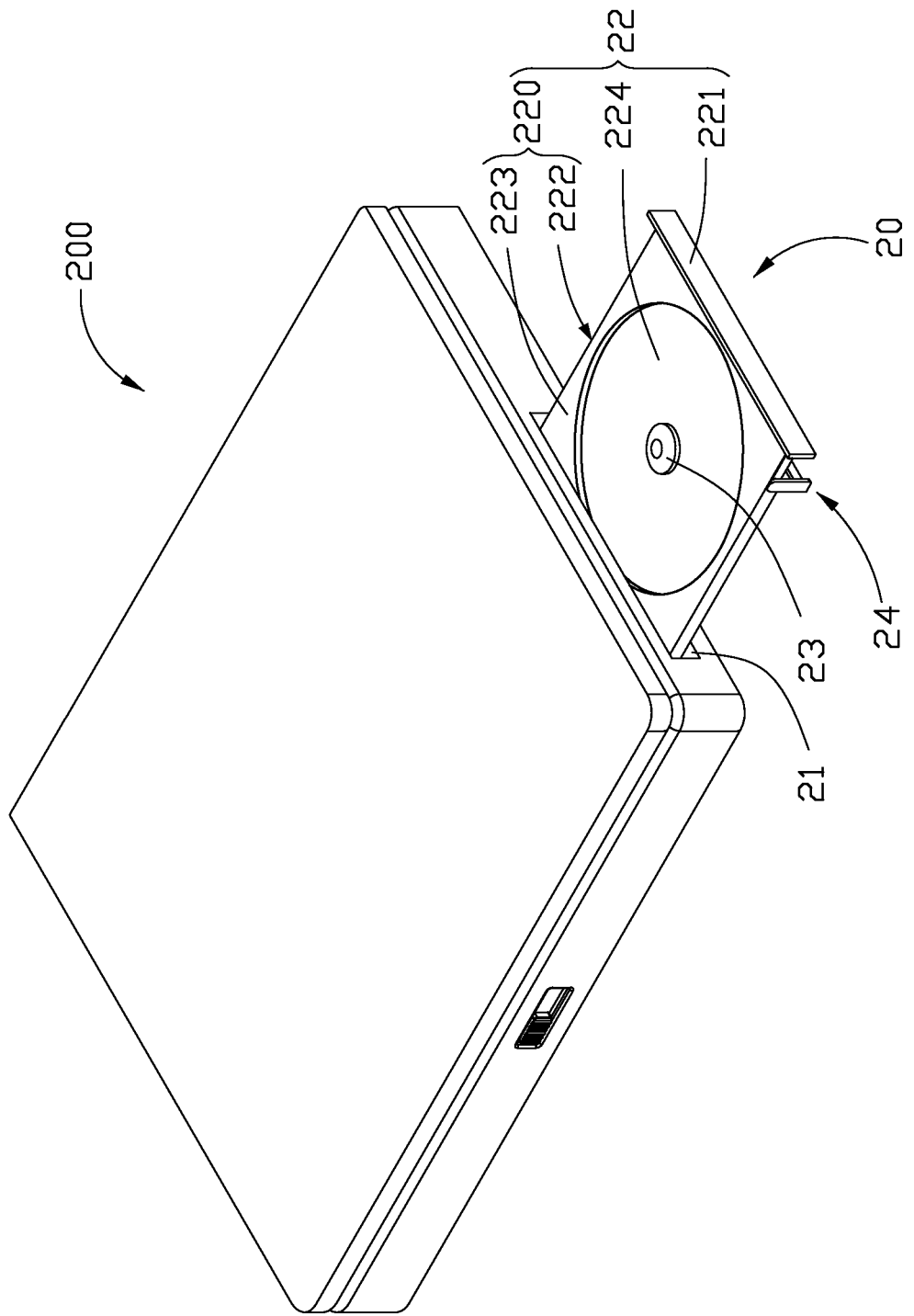
FIG. 1 is an isometric view of a notebook computer with an optical disk drive according to a first preferred embodiment of the present invention.

Referring to FIG. 1, a notebook computer 200 with an optical disk drive 20 in accordance with a first preferred embodiment is shown. The optical disk drive 20 includes an auto-load entrance 21, a tray 22, a turntable 23, and a supporting bracket 24. The auto-load entrance 21 is located at a side of the notebook computer 200. The tray 22 is installed inside the notebook computer 200 in a movable way, and can slide out or slide into the notebook computer 200. The tray 22 includes a base plate 220 and a bar plate 221. The base plate 220 includes two opposite side surfaces 222 and a main surface 223 adjoining the two opposite side surfaces 222. The base plate 220 defines a circular disk carriage 224 in the main surface 223. The turntable 23 is position at a center point of the circular disk carriage 224 of the base plate 220. The bar plate 221 are connected to distal ends of the two opposite side surfaces 222 of the base plate 220 for covering the entrance 21.

Figure 2:
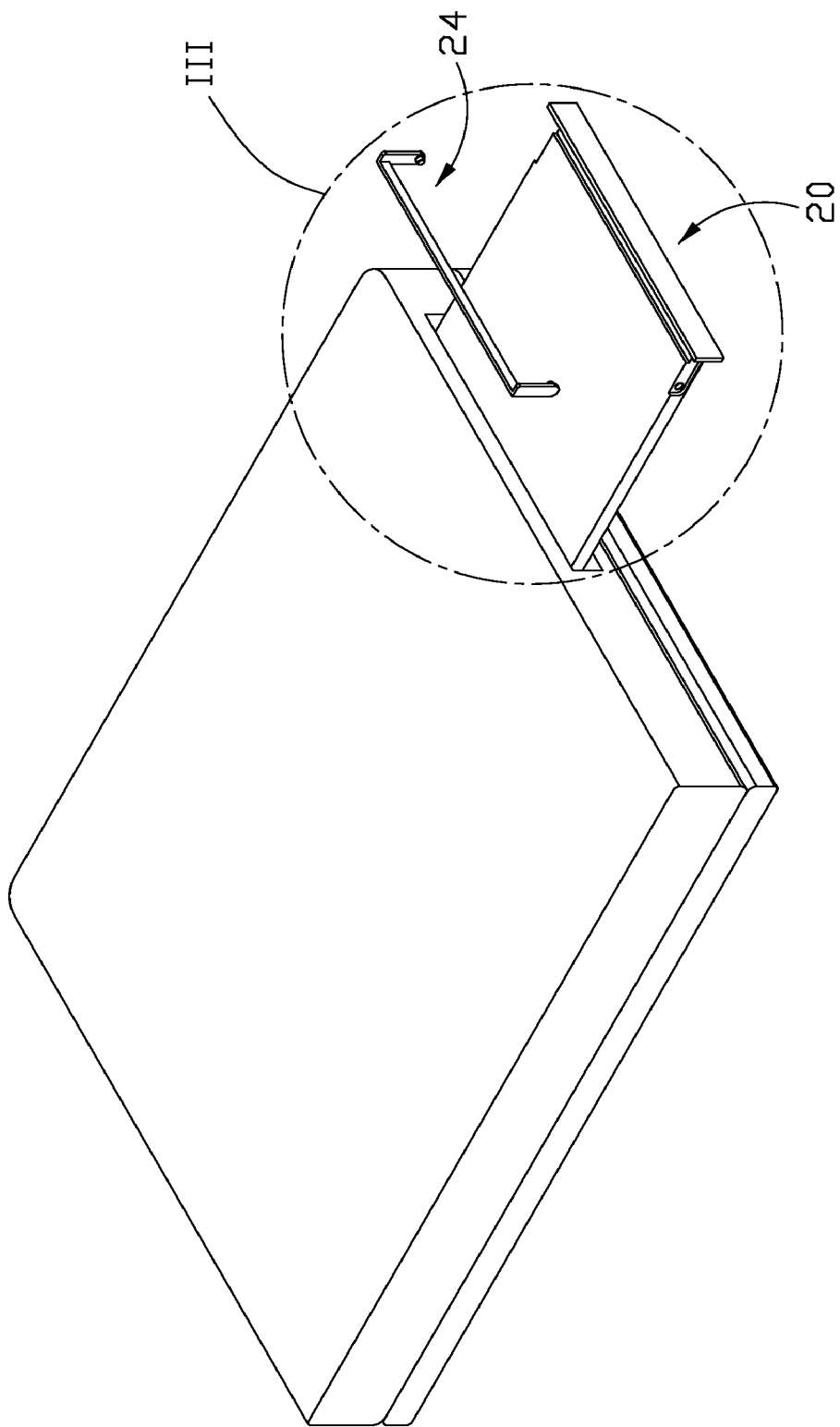
FIG. 2 is similar to FIG. 1, but viewed from another aspect.
Figure 3:
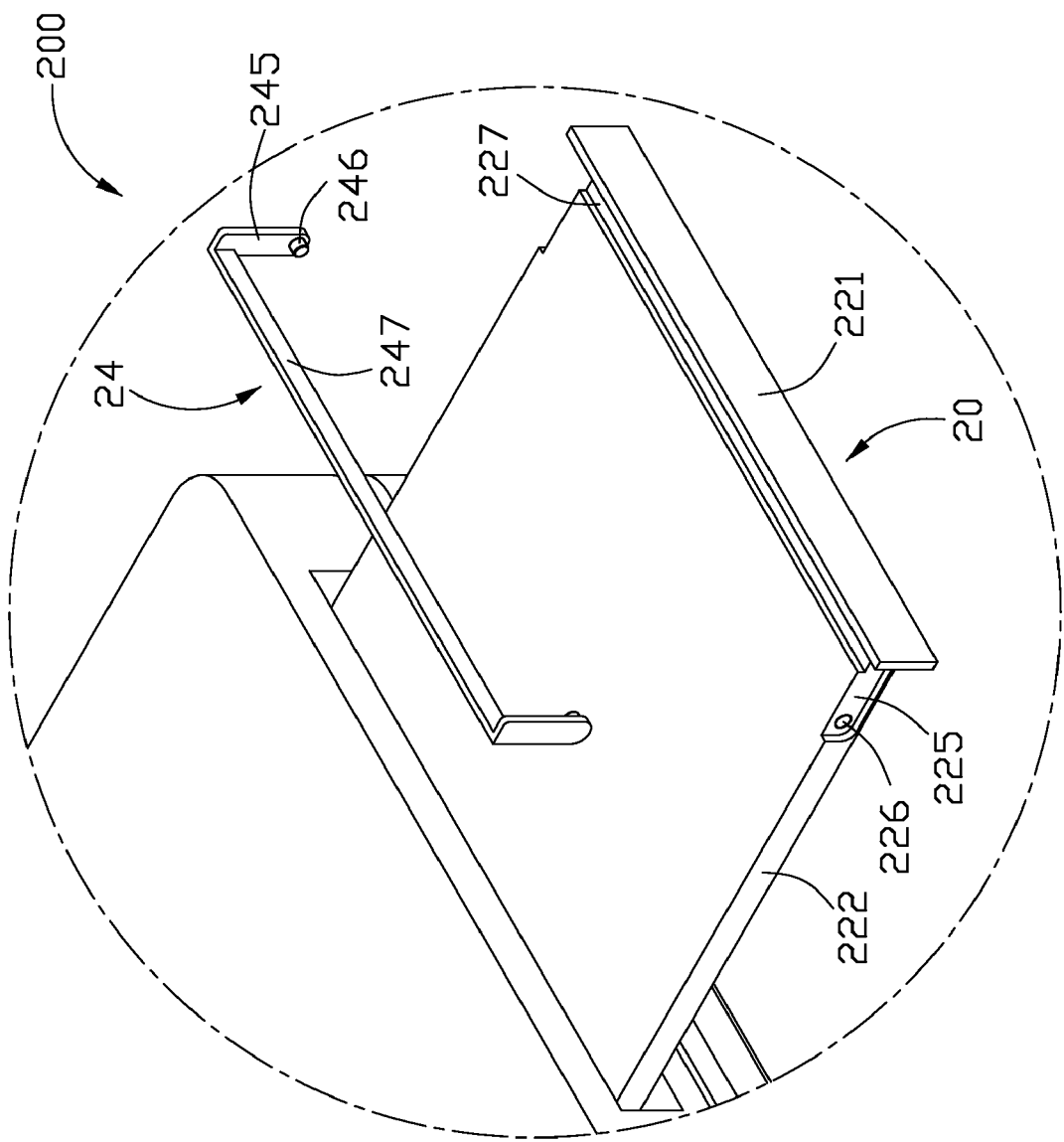
FIG. 3 is an enlarged view of a circle portion III of FIG. 2.

Referring to FIGS. 2 and 3, the base plate 220 includes two receiving grooves 225 defined in each of the two opposite side surfaces 222 adjoining the bar plate 221, and two assembling holes 226 respectively defined in each of the receiving grooves 225 away from the bar plate 221. The base plate 220 further includes a slot 227 defined on an opposite surface of the main surface 223 adjoining the bar plate 221. The slot 227 communicates with the two receiving grooves 225.

The supporting bracket 24 includes an elongated plate 247, two arms 245 extending perpendicularly from two ends of the elongated plate 247, and two opposite pins 246 extending from each of the arms 245. The two pins 246 are rotatably mounted into the assembling holes 226 respectively, and the two arms 245 and the elongated plate 247 can be respectively accommodated in the two receiving grooves 225 and the slot 227.

When the optical disk drive 20 opens the tray 22, the tray 22 extends from the notebook computer 200 and the elongated plate 247 of the supporting bracket 24 falls down to contact with a table surface (not shown) where the notebook computer 200 is located due to its gravity. Accordingly, the supporting bracket 24 supports the tray 22. When a CD is placed over the turntable 23, the tray 22 will not be bent downward because of support from the supporting bracket 24. Thus, a usage life of the optical disk drive 10 is relatively increased. When the optical disk drive 20 closes the tray 22, the two arms 245 are rotated slowly until the arms 245 are completely accommodated into the receiving grooves 225, thereby the elongated plate 247 are also accommodated into the slot 227, and finally the tray 22 with the supporting bracket 24 slide into the notebook computer 200.

In this embodiment, each of the receiving grooves 225 defines an arcuate corner away from the bar plate 221, and a distal end of each of the arms 245 is configured to be arcuate in shape accordingly. This configuration helps the arms 245 being rotated smoothly relative to the assembling holes 226.

Figure 4:
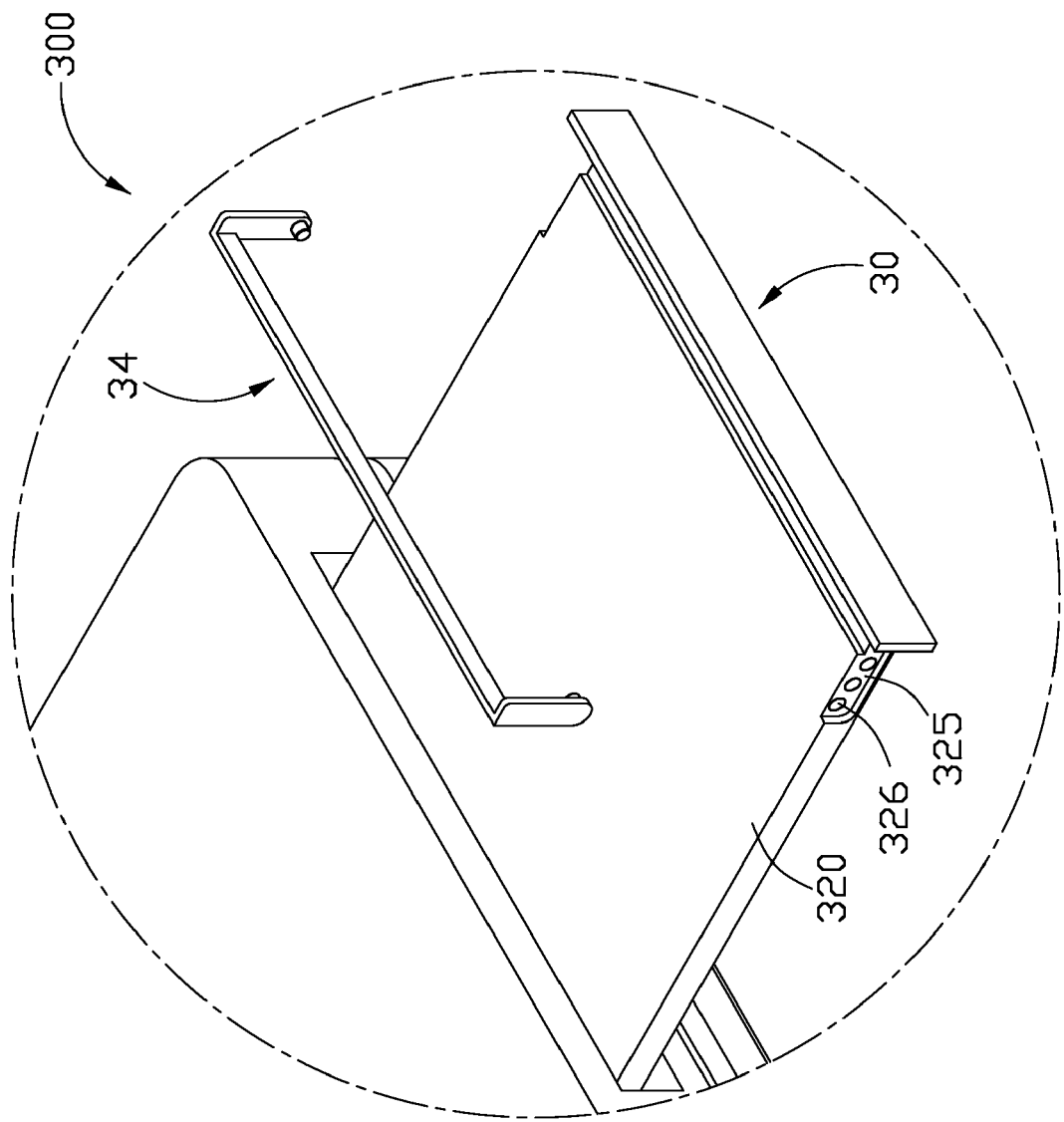
FIG. 4 is a partial, isometric view of an optical disk drive according to a second preferred embodiment of the present invention.

Referring to FIG. 4, a notebook computer 300 with an optical disk drive 30 in accordance with a second preferred embodiment is shown. The optical disk drive 30 is similar in principle to the optical disk drive 20 of the first embodiment, however base plate 320 of tray 30 of the optical disk drive 30 defines three assembling holes 326 in each of receiving grooves 325. Supporting bracket 34 of the optical disk drive 30 can be assembled to the three assembling holes 326 according to a distance from the tray 32 to a table surface (not shown).

Figure 5:
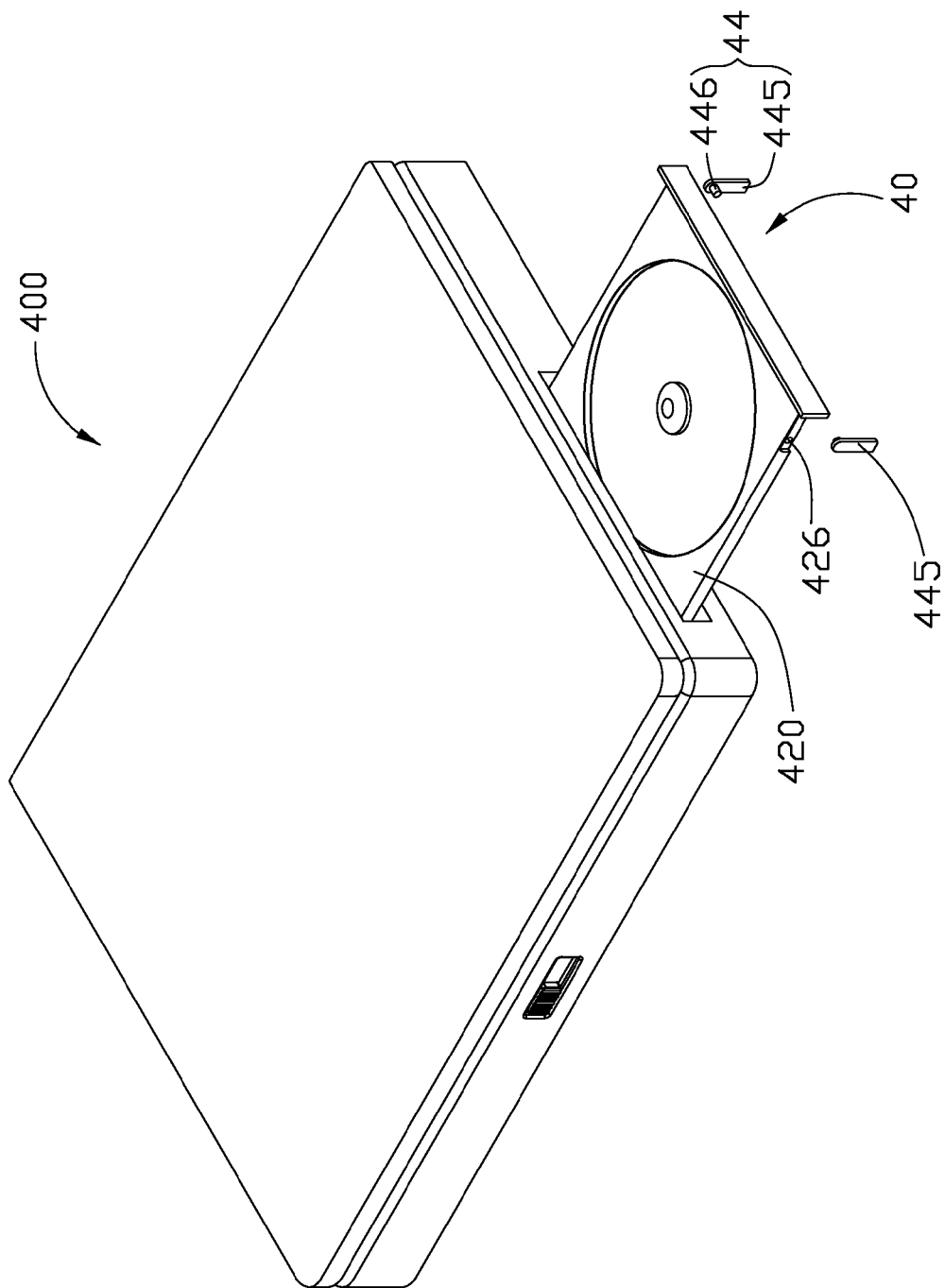
FIG. 5 is an isometric view of a notebook computer with an optical disk drive according to a third preferred embodiment of the present invention.
Figure 6:
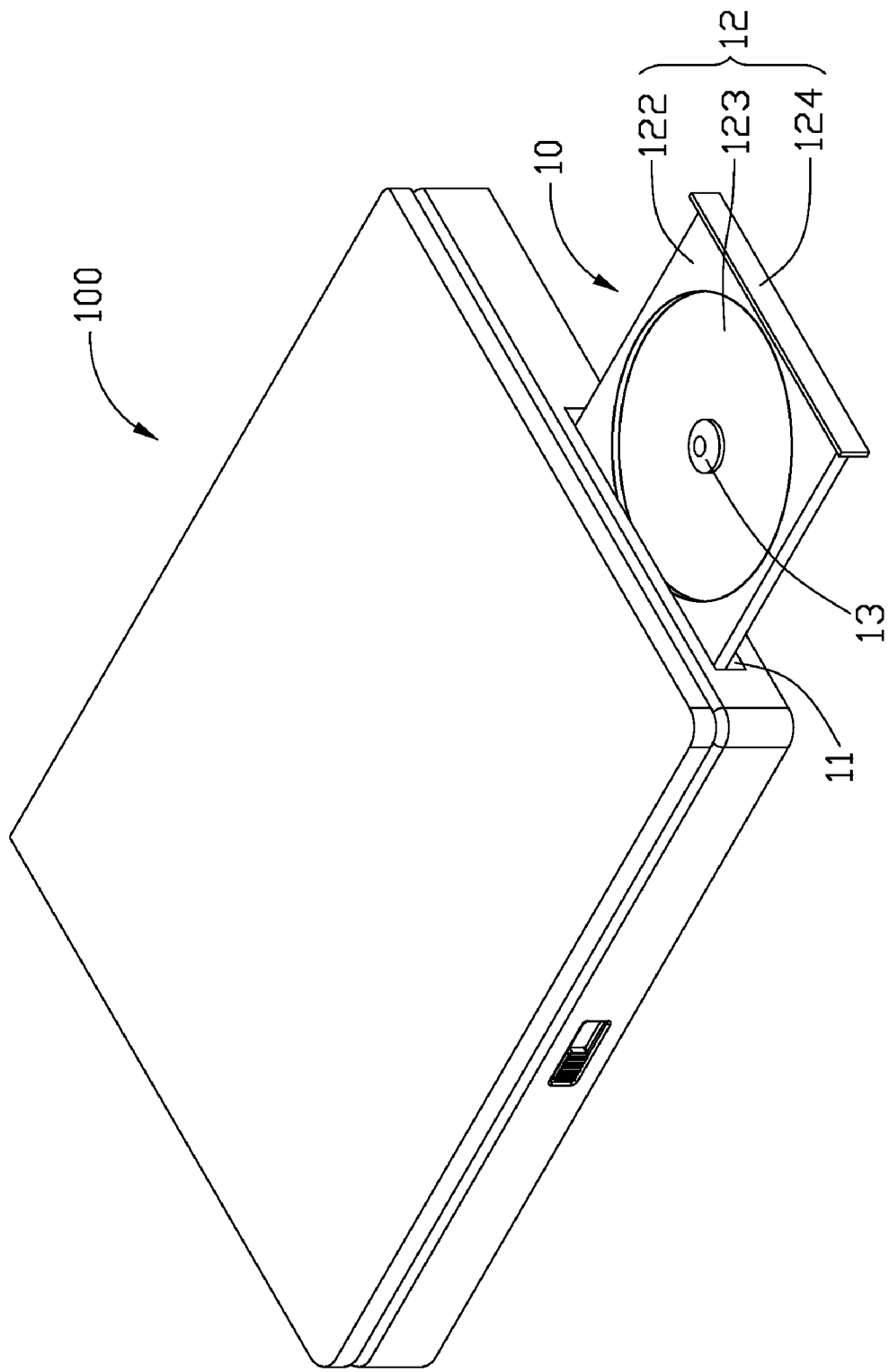
FIG. 6 is an isometric view of a conventional notebook computer with a typical optical disk drive.

Referring to FIG. 5, a notebook computer 400 with an optical disk drive 40 in accordance with a second preferred embodiment is shown. The optical disk drive 40 is similar in principle to the optical disk drive 20 of the first embodiment, however the supporting bracket 44 is different from the supporting bracket 24. The supporting bracket 44 includes two arms 445, and two opposite pins 446 extending from the arms 445 respectively. Compared with the supporting bracket 24, an elongated plate is omitted from the supporting bracket 44. The two arms 445 are rotatably mounted into assembling holes 426 of base plate 420 of tray 42 respectively. Compared with the base plate 220, a slot for accommodating the elongated plate is omitted from the base plate 420 correspondingly.

It should be pointed out that the arms 245, 445 each defines a through hole for replacing the pins 246, 446. The supporting bracket 24, 34, 44 may further include two fixing elements mounted into the through hole of the arms and the assembling holes 226, 326, 426, thereby the supporting bracket 24, 34, 44 can also be rotatably connected to the tray 22, 32, 42.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical disk drive for notebook computer, comprising:
    a tray comprising a base plate and a bar plate, the base plate having two opposite side surfaces and a main surface adjoining the two opposite side surfaces, the bar plate connected to distal ends of the two opposite side surfaces of the base plate, the base plate comprising two receiving grooves respectively defined in each of the two opposite side surfaces adjoining the bar plate, two assembling holes respectively defined in each of the receiving grooves away from the bar plate, and a slot defined on an opposite surface of the main surface adjoining the bar plate communicating with the two receiving grooves; and
    a supporting bracket rotatably connected to the tray for supporting the tray when the tray extends from the notebook computer, wherein the supporting bracket comprises an elongated plate, two arms extending perpendicularly from two ends of the elongated plate, and two pins extending from each of the arms; the two arms are rotatably mounted into the assembling holes respectively, the two arms and the elongated plate respectively accommodated in the two receiving grooves and the slot when the optical disk drive closes the tray.

2. The optical disk drive for notebook computer according to claim 1, wherein each of the receiving grooves defines an arcuate corner away from the bar plate, and a distal end of each of the arms is arcuate in shape accordingly.

3. An optical disk drive for notebook computer, comprising:
    a tray comprising a base plate and a bar plate, the base plate having two opposite side surfaces and a main surface adjoining the two opposite side surfaces, the bar plate connected to distal ends of the two opposite side surfaces of the base plate, the base plate comprising two receiving grooves respectively defined in each of the two opposite side surfaces adjoining the bar plate, two assembling holes respectively defined in each of the receiving grooves away from the bar plate, and a slot defined on an opposite surface of the main surface adjoining the bar plate communicating with the two receiving grooves; and
    a supporting bracket rotatably connected to the tray for supporting the tray when the tray extends from the notebook computer, wherein the supporting bracket comprises an elongated plate, two arms extending perpendicularly from two ends of the elongated plate; each arm defines a through hole and the two arms are rotatably mounted into the assembling holes respectively via a fixing element, the two arms and the elongated plate respectively accommodated in the two receiving grooves and the slot when the optical disk drive closes the tray.

4. A notebook computer comprising an optical disk drive comprising a tray comprising a base plate having two opposite side surfaces and a main surface adjoining the two opposite side surfaces, two receiving grooves respectively defined in each of the two opposite side surfaces, two assembling holes respectively defined in each of the receiving grooves, and a slot defined on an opposite surface of the main surface communicating with the two receiving grooves; and
    a supporting bracket rotatably connected to the tray for supporting the tray when the tray extends from the notebook computer, wherein the supporting bracket comprises an elongated plate, two arms extending perpendicularly from two ends of the elongated plate, and two pins extending from each of the arms; the two arms are rotatable mounted into the assembling holes respectively, the two arms and the elongated plate respectively accommodated in the two receiving grooves and the slot when the optical disk drive closes the tray.

5. The notebook computer according to claim 4, wherein the tray further comprises a bar plate connected to distal ends of the two opposite side surfaces of the base plate.

6. The notebook computer according to claim 5, wherein each of the receiving grooves defines an arcuate corner away from the bar plate, and a distal end of each of the arms is configured to be arcuate in shape accordingly.

* * * * *